United States Patent [19]

Spaida et al.

[11] 4,255,923
[45] Mar. 17, 1981

[54] PICKUP FOR STALK-CROP HARVESTER

[75] Inventors: Hans-Peter Spaida; Georg Scholtissek, both of Neustadt; Manfred Teichmann, Bischofswerda, all of German Democratic Rep.

[73] Assignee: VEB Kombinat Fortschritt Landmaschinen Neustadt in Sachsen, Neustadt in Sachsen, German Democratic Rep.

[21] Appl. No.: 49,912

[22] Filed: Jun. 19, 1979

[30] Foreign Application Priority Data

Jun. 20, 1978 [DD] German Democratic Rep. ... 206117

[51] Int. Cl.³ .................... A01D 43/02; A01D 89/00
[52] U.S. Cl. ........................................ 56/364; 56/14.4
[58] Field of Search .............. 56/364, 363, 14.3, 14.4, 56/14.5

[56] References Cited

U.S. PATENT DOCUMENTS

| | | | |
|---|---|---|---|
| 1,585,243 | 5/1926 | Hanselman | 56/14.5 |
| 2,391,763 | 12/1945 | Anderson | 56/364 |
| 2,570,065 | 10/1951 | Melroe | 56/364 |
| 2,880,564 | 4/1959 | Degenhardt | 56/364 |
| 3,478,500 | 11/1969 | Rhoads | 56/364 |
| 3,797,216 | 3/1974 | Resetich | 56/364 |
| 3,849,824 | 11/1974 | Doering | 56/364 |
| 3,924,391 | 12/1975 | Cheatum | 56/364 |

Primary Examiner—Paul J. Hirsch
Attorney, Agent, or Firm—Karl F. Ross

[57] ABSTRACT

A stalk-crop harvester having a chassis displaceable along the ground in a transport direction and supporting a transverse conveyor having in turn a forwardly open transversely elongated intake has a pickup formed of a front drum and a rear drum. The front drum has a front axle centered on a horizontal front axis transverse to the transport direction and forward of the conveyor intake. This front axle carries a plurality of spring tines. The rear drum has a rear axle centered on a horizontal rear axis transverse to the transport direction and between the front axis and the intake. A plurality of axially spaced rigid rear tines is fixed on the rear axle axially offset from but engageable between the spring tines of the front axle. A plurality of strippers secured to the harvester chassis at the intake extend forwardly between the rigid tines and a crop holddown secured to the chassis extends backwardly from above the front axle to above the intake. The axles are codirectionally rotated to pick crop up off the ground with the front spring tines, transfer the picked-up crop to the rigid tines of the rear drum, then strip the transferred crop from the rigid tines with the strippers and feed it into the intake.

10 Claims, 4 Drawing Figures

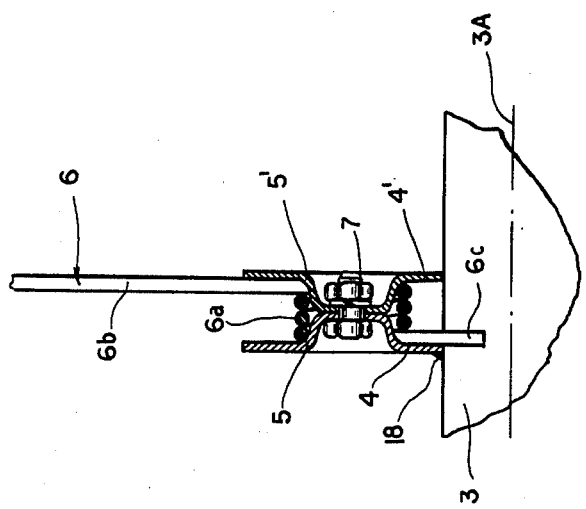
FIG.3
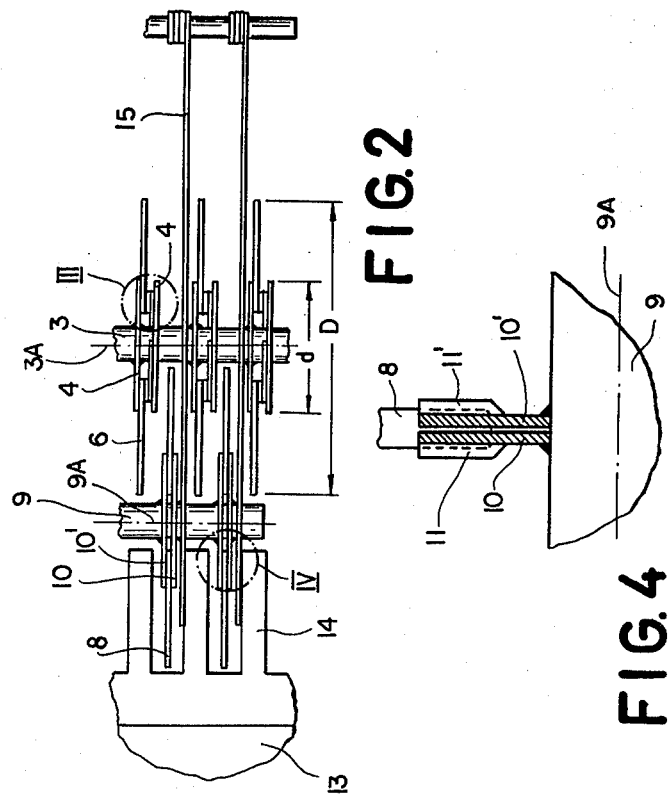
FIG.2
FIG.4

4,255,923

PICKUP FOR STALK-CROP HARVESTER

FIELD OF THE INVENTION

The present invention relates to a pickup for a stalk-crop harvester. More particularly this invention concerns such a pickup usable in a relatively wide stalk-crop harvester having an intake conveyor extending transversely of the transport direction the full width of the machine.

BACKGROUND OF THE INVENTION

A pickup for a stalk-crop harvester normally has tines that engage forwardly down against the ground to pick cut crop up off the ground and move it backwardly to the transversely elongated intake of the transverse conveyor. To protect this conveyor, it is normally mounted relatively high and well behind the front portion of the pickup. Thus the tines must follow a relatively long path. In addition the tines must normally move from a downwardly directed position where they engage the ground and pick up the crop to a forwardly directed position, and then to an upwardly directed position as they move up and around to convey the picked-up crop back to the conveyor.

To this end relatively complex mechanism such as shown in German published patent application No. 1,936,058 is provided. In this arrangement the tines are carried on respective holders which pass along a normally kidney-shaped cam. Stripper plates are provided between the paths of the tines, there normally being several sets of such tines spaced transversely apart relative to the transport direction. Various rollers and roller bearings are provided to ensure low-friction travel of the holders for the tines in the pickup mechanism.

Such an arrangement has several disadvantages. First of all the complex machinery necessary for the spring tines to move in the necessary path is quite expensive. As the number of such units must be increased with increasing width of the machine, measured transverse to its normal direction of travel, the cost can become prohibitive. Furthermore the plates that lie between the paths of the tines are also frequently damaged. Repair of these plates is an onerous task requiring considerable downtime for the machine and necessitating skilled labor. Furthermore the complex and expensive mechanism requires considerable expensive maintenance, so that not only are the first costs for such a machine relatively high, but the upkeep is also expensive.

OBJECTS OF THE INVENTION

It is therefore an object of the present invention to provide and improved pickup for a harvester.

Another object is the provision of such a pickup which is substantially simpler and less expensive to manufacture so that it is well suited for use in relatively wide stalk-crop harvesters.

A further object is to provide such a system which can be serviced easily by even a relatively unskilled mechanic.

SUMMARY OF THE INVENTION

These objects are attained according to the instant invention in a pickup for a stalk-crop harvester having a chassis displaceable along the ground in a transport direction and supporting a transverse conveyor having a forwardly open and transversely elongated intake. According to this invention the pickup comprises a pair of horizontally spaced front and rear axles, the rear axle being between the front axis of the front axle and the intake of the harvester. A plurality of axially spaced front spring tines is fixed on the front axle and the rear axle carries a plurality of axially spaced rigid tines which are axially offset from but engageable between the front tines. The rear axis is somewhat above the front axis. In addition a crop holddown is secured to the chassis and extends backwardly in the transport direction from above the front axle to above the intake. A plurality of strippers is secured to the chassis at the intake and extends forwardly to between the rigid tines of the rear axle. These axles are rotated by means such as the drive motor of the harvester so as to pick crop off the ground with the front spring tines, then transfer the picked-up crop to the rigid tines, then strip the transferred crop from the rigid tines with the strippers and feed it into the intake.

According to this invention, therefore, the complex arrangements of traveling tines are replaced by two separate sets of oribital tines. All the complex guiding and holding arrangements for the traveling tines are eliminated and relatively simple front and rear drums formed by the respective axles and tines replace them. It is possible to make the front tines quite springy and the rear tines relatively stiff, according to this invention, and to provide twice as many rear tines as many rear tines as front tines to ensure jam-free operation of the arrangement.

According to further features of this invention each axle carries for each set of tines a respective fixed plate and a respective removable plate. The fixed plates are actually annular disks welded to the respective axles, and the removable plates are identical disks that are free to move axially upon the respective axles. Such arrangements can use bolts securing the two plates of each pair together, and in both arrangements the plurality of tines project from each such pair of plates.

According to this invention the spring tines are formed of a central spring coil from which projects one generally long leg that extends almost perfectly radially from the front axis, and another leg clamped between the front axle and the trailing coil, in the transport direction. The fixed and movable plates of each pair are formed with inwardly directed stamped bosses angularly equispaced and provided with the same radial spacing from the front axis. Each boss of each fixed plate engages through the respective coil of the respective tine with the corresponding boss of the respective movable plate so as securely to hold the respective tine in place, the turns of the coil being such that the coils tighten on the respective bosses if their tines are bent back agaist its normal rotational direction. The disks have outer diameters equal to between one-third and two-thirds of the diameter of the orbit defined by the outer tips of the respective tines.

The rear axle similarly has two plates, but here the rigid tines are U-shaped and received within mating recesses formed in the respective pair of plates. These plates can be permanently connected together or bolted together. In either situation the rigid tines will be extremely securely anchored. They normally extend backwardly in the direction to rotation of the respective axle. The respective disks have diameters equal to half of the diameter of the orbits of the outer tips of the respective tines. Furthermore the two axles are spaced apart so that the tips of the respective tines come relatively close to the axle of the other drum, engaging well between the plates thereof. In this manner extremely effective stripping-off of the picked-up crop on the front drum by the rear drum is ensured. The strippers extend forwardly from below the intake and engage similarly almost to the axle of the rear drum. What is more, these plates prevent the crop from coming into the area immediately adjacent the axle where such crop can be wound up and require stopping of the machine to clear the pickup.

BRIEF DESCRIPTION OF THE DRAWING

FIG. 2 is a top view of the pickup shown in FIG. 1; and

FIGS. 3 and 4 are large-scale sectional views of the details indicated at III and IV in FIG. 2.

SPECIFIC DESCRIPTION

Figure 1:
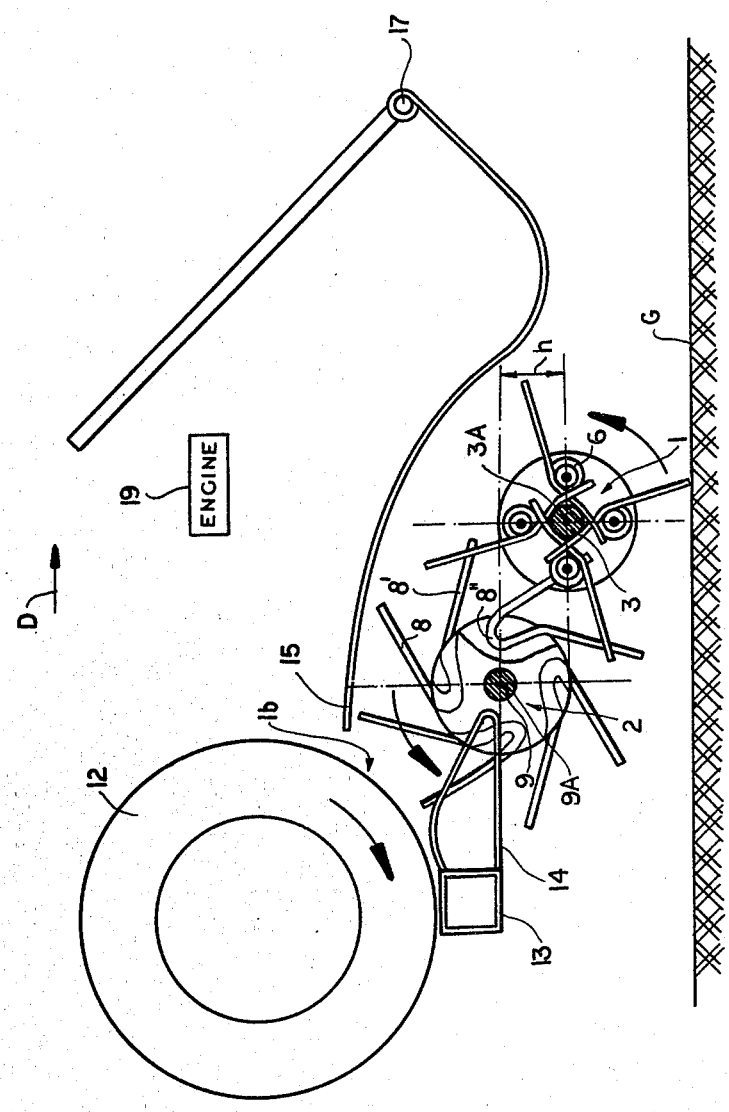
FIG. 1 is a vertical section in partly schematic form through a pickup on a crop harvester according to this invention.

As shown in FIGS. 1 and 2 a harvester according to this invention has a chassis shown here in part as a beam 13 provided with an intake auger 12 defining an elongated input 16. A plurality of hold-down wires 15 extend down and then upwardly from a front member 17 of the chassis to a point immediately ahead of the rotating intake conveyor 12. Cut crop is picked off the ground G underneath the machine by a front drum 1 having spring tines 6 and is transferred to a transport drum 2 having rigid tines 8 and 8'. Then the transferred crop is stripped off the rear drum 2 by means of stripper elements 14 secured to the chassis beam 13 and enters the intake 16 of the conveyor 12.

As shown in more detail in FIG. 3 the front drum 1 has a front shaft 3 centered on an axis 3A that extends horizontally perpendicular to the normal direction D (FIG. 1) of travel of the machine. This shaft 3 carries a plurality of axially equispaced plates 4 secured to it by welds 18, and a corresponding plurality of identical plates 4' that are limitedly axially displaceable on the shaft 3. The plates 4 and 4' of each pair are formed with angularly equispaced and axially confronting bosses 5 and 5' stamped out of them so as to form a plurality of short connecting necks between the two plates 4 and 4' of each pair. Each of the tines 6 has a central coil 6a wound around one pair of bosses 5 and 5a, has a relatively long spring leg 6b extending generally radially from the drum 1, and another short leg 6c which as seen in FIG. 1 is braced between the axle 3 and the following set of bosses 5 and 5'. A screw and bolt 7 passes through the plates 4 and 4'0 at each of the pairs of bosses 5 and 5'. This arrangement therefore ensures extremely secure mounting of the tines 6 in place, yet also makes it relatively simple for any of the tines to be replaced. A mechanic needs merely unbolt the four bolts 7 of any of the pairs of the plates so that the movable plate 4' can be moved away and one or all of the tines 6 replaced.

The rear drum 2 is similarly formed with a horizontal axle 9 centered on an axis 9a and provided with plates 10 and 10' formed with confronting inwardly open U-shaped recesses 11 and 11'. In this arrangement the tines 8 and 8' are legs of a heavy-duty wire bent in a U-shape and having a bight portion 8" connecting them. The plates 10 and 10' can both be welded to the shaft 9, as damage to the rear tines 8 and 8' is very infrequent. It is within the scope of the invention to provide fixed and movable plates on the rear drum 2 similar to the arrangement of FIG. 3, in which case it is merely necessary to leave the plate 10' unwelded and provide bolts extending between the plates 10 and 10', normally within the bight 8" between the tines 8 and 8'.

The plates 4, 4' and 10 have outer diameters d equal here to slightly less than half of the diameters D of the orbit defined by the tips of the respective tines 6, 6 or 8'. In addition the rear axis 9A is above the front axis 3A by a distance h here equal to approximately half of the diameter d. The axes 3a and 9a are spaced apart so that the tips of the tines 6 almost engage the shaft 9A and vice versa. This ensures excellent stripping off of picked-up crop from the tines 6 by the tines 8 and 8'. Similarly, the strippers 14, which are formed as U-shaped pieces of sheet metal, engage almost to the axle 9, so that the material is stripped off the rear drum 2 effectively. This last-mentioned stripping-off is aided by the fact that the rear tines 8 and 8' are inclined backwardly in the rotation direction of the respective drum 2.

According to this invention the drums 1 and 2 are codirectionally rotated by a drive system powered by the engine 19 of the harvester in such a manner that as the tines 6 sweep the ground they will be moving forwardly in the travel direction. Thus crop lying on the ground will be picked up by these tines 6 and displaced upwardly against the holddown wires 15. As the tines 6 orbit about, this picked-up crop will be moved backwardly, and then transferred to the conveyor drum 2. The conveyor drum 2 has twice as many tines as the drum 1, so that this drum 2 will have no problem transporting all of the crop delivered to it by the drum 1. Thereafter the crop is stirred from the conveyor drum 2 by the strippers 14 and picked-up by the auger of the conveyor 12.

In the system according to the instant invention two relatively simple drums therefore replace a complex pick-up arrangement. The construction of these drums is such that they can be serviced with ease in the event that one of the tines is damaged. At the same time the crop can be picked up cleanly and transported back in the harvester without being excessively damaged.

We claim:

1. In a stalk-crop harvester having a chassis displaceable along the ground in a transport direction and supporting a transverse conveyor having a forwardly open and transversely elongated intake, a pickup comprising:
   a front axle centered on a horizontal front axis transverse to said direction and forward of said intake;
   a plurality of axially spaced front spring tines fixed on said front axle;
   a rear axle centered on a horizontal rear axis transverse to said direction and between said front axis and said intake, said front tines having tips forming a front orbit closely juxtaposed with said rear axle;
   a plurality of axially spaced rigid rear tines fixed on said rear axle and axially offset from but engageable between said spring tines of said front axle, said rear tines having tips forming a rear orbit closely juxtaposed with said front axle;
   a plurality of strippers secured to said chassis at said intake and extending forwardly to between said rigid tines;
   a crop holddown secured to said chassis and extending backwardly in said direction from above said front axle to above said intake; and
   means for rotating said axle synchronously in the same rotational sense with forward displacement of said tines at their regions of closest approach to the ground and thereby picking crop up off the ground with said front spring tines, then transferring the picked-up crop to said rigid tines, then stripping the transferred crop from said rigid tines with said strippers and feeding it into said intake.

2. The pickup defined in claim 1 wherein said rear axis is above said front axis.

3. The pickup defined in claim 1 wherein said fixed tines are at least twice as numerous as said spring tines.

4. In a stalk-crop harvester having a chassis displaceable along the ground in a transport direction and supporting a transverse conveyor having a forwardly open and transversly elongated intake, a pickup comprising:
- a front axle centered on a horizontal front axis transverse to said direction and forward of said intake;
- a plurality of axially spaced front spring tines fixed on said front axle said front axle being provided with a plurality of axially spaced pairs of plates and with means for clamping the plates of each pair axially together to sandwich and clamp at least one respective spring tine, each pair including one fixed plate rigidly secured to said front axle and one removable plate held by the clamping means to the respective fixed plate;
- a rear axle centered on a horizontal rear axis transverse to said direction and between said front axis and said intake;
- a plurality of axially spaced rigid rear tines fixed on said rear axle and axially offset from but engageable between said spring tines of said front axle;
- a plurality of strippers secured to said chassis at said intake and extending forwardly to between said rigid tines;
- a crop holddown secured to said chassis and extending backwardly in said direction from above said front axle to above said intake; and
- means for rotating said axles and thereby picking crop up off the ground with said front spring tines, then transferring the picked-up crop to said rigid tines, then stripping the transferred crop from said rigid tines with said strippers and feeding it into said intake.

5. The pickup defined in claim 4 wherein at least one plate of each pair is formed with a plurality of angularly projecting bosses engaging the other plate of the respective pair, each spring tine having an inner end formed as a substantially closed loop engaged around one of said bosses, whereby each pair of plates carries a plurality of such spring tines.

6. The pickup defined in claim 5 wherein said plates are disks having outer diameters, said spring tines having outer tips defining on rotation of said front axle an orbit having an orbit diameter, said outer diameters being equal to between one-third and two-thirds of said orbit diameter.

7. The pickup defined in claim 5 wherein each of said spring tines has a coil engaged around the respective boss, one relatively long leg having the respective tip, and one short leg braced against said front axle, said bosses being generally angularly equispaced about said front axle.

8. The pickup defined in claim 5 wherein both of said plates of each of said pair are formed with such bosses, said means for clamping being a screw connection at and through each boss of said fixed plates and the corresponding boss of the respective removable plate.

9. In a stalk-crop harvester a chassis displaceable along the ground in a transport direction and supporting a transverse conveyor having a forwardly open and transversely elongated intake, a pickup comprising:
- a front axle centered on a horizontal front axis transverse to said direction and forward of said intake;
- a plurality of axially spaced front spring tines fixed on said front axle;
- a rear axle centered on a horizontal rear axis transverse to said direction and between said front axis and said intake;
- a plurality of axially spaced rigid rear tines fixed on said rear axle and axially offset from but engageable between said spring tines of said front axle; said rear axle being provided with a plurality of axially spaced fixed plates and with a corresponding plurality of removable holding plates clamped to the respective fixed plates over said rigid tines, said fixed plates each forming with the respective removable holding plates a plurality of outwardly open recesses receiving said rigid tines;
- a plurality of strippers secured to said chassis at said intake and extending forwardly to between said rigid tines;
- a crop holddown secured to said chassis and extending backwardly in said direction from above said front axle to above said intake; and
- means for rotating said axles and thereby picking crop up off the ground with said front spring tines, then transferring the picked-up crop to said rigid tines, then stripping the transferred crop from said rigid tines with said strippers and feeding it into said intake.

10. The pick-up defined in claim 9 wherein said fixed tines are generally U-shaped and each have a pair of legs each received in a respective recess and both projecting radially from said axle.

* * * * *